US012054627B2

(12) United States Patent
Palyukh et al.

(10) Patent No.: US 12,054,627 B2
(45) Date of Patent: Aug. 6, 2024

(54) LIGHTWEIGHT JOINT COMPOUND COMPOSITION

(71) Applicant: National Gypsum Properties, LLC, Charlotte, NC (US)

(72) Inventors: Paul Palyukh, Windermere, FL (US); Charles Miner, Fort Worth, TX (US)

(73) Assignee: PROFORM FINISHING PRODUCTS, LLC, Charlotte, NC (US)

( * ) Notice: Subject to any disclaimer, the term of this patent is extended or adjusted under 35 U.S.C. 154(b) by 187 days.

(21) Appl. No.: 17/097,103

(22) Filed: Nov. 13, 2020

(65) Prior Publication Data

US 2021/0147703 A1    May 20, 2021

Related U.S. Application Data

(60) Provisional application No. 62/935,141, filed on Nov. 14, 2019.

(51) Int. Cl.
| | | |
|---|---|---|
| *C09D 7/61* | (2018.01) | |
| *C09D 5/00* | (2006.01) | |
| *C09D 7/63* | (2018.01) | |
| *C09D 123/08* | (2006.01) | |
| *C09D 131/04* | (2006.01) | |

(52) U.S. Cl.
CPC .......... *C09D 123/0853* (2013.01); *C09D 5/00* (2013.01); *C09D 7/61* (2018.01); *C09D 7/63* (2018.01); *C09D 131/04* (2013.01)

(58) Field of Classification Search
CPC ...... C09D 123/0853; C09D 7/61; C09D 7/63; C09D 5/00; C09D 131/04

USPC .......................................................... 524/42
See application file for complete search history.

(56) References Cited

U.S. PATENT DOCUMENTS

| | | | |
|---|---|---|---|
| 4,286,995 | A | 9/1981 | Smith et al. |
| 5,653,797 | A | 8/1997 | Patel |
| 6,200,380 | B1 | 3/2001 | Finkelstein et al. |
| 6,436,185 | B1 | 8/2002 | Ayambem et al. |
| 6,645,291 | B2 | 11/2003 | Ayambem et al. |
| 6,790,277 | B2 | 9/2004 | Ayambem |
| 6,936,099 | B2 | 8/2005 | Ayambem |
| 9,115,027 | B2 | 8/2015 | Ayambem et al. |
| 9,643,887 | B2 | 5/2017 | Ayambem et al. |
| 2004/0060480 | A1 * | 4/2004 | Ayambem ............... C04B 26/04 106/793 |
| 2017/0081245 | A1 * | 3/2017 | Margheritis ............ C04B 26/02 |
| 2019/0375681 | A1 * | 12/2019 | Donovan ............... C04B 28/145 |

FOREIGN PATENT DOCUMENTS

GB    2132185 A  *  7/1984  ............. C04B 14/10

* cited by examiner

*Primary Examiner* — Kelechi C Egwim
(74) *Attorney, Agent, or Firm* — Dority & Manning, P.A.

(57) ABSTRACT

In the present disclosure, a joint compound composition is disclosed. The joint compound composition comprises water, a cementitious filler, a mineral filler, and an elastomer wherein the joint compound composition exhibits a viscosity of 50 poise or less when measured at a temperature of 23° C. and shear rate of 100 $s^{-1}$ and/or a yield stress of 1,500 dynes/$cm^2$ or less. The present disclosure is also directed to a method of making a joint compound composition. The method comprises combining and mixing water, a cementitious filler, a mineral filler, and an aqueous dispersion including an elastomer.

21 Claims, No Drawings

LIGHTWEIGHT JOINT COMPOUND COMPOSITION

CROSS-REFERENCE TO RELATED APPLICATION

The present application claims filing benefit of U.S. Provisional Patent Application Ser. No. 62/935,141 having a filing date of Nov. 14, 2019, and which is incorporated herein by reference in its entirety.

BACKGROUND

Joint compound compositions are commonly used in the building industry in combination with gypsum wallboards. For instance, gypsum wallboards are affixed to a support structure, typically using screws or nails. When multiple gypsum wallboards are affixed, the gaps between adjacent gypsum wallboards are typically referred to as joints. In order to achieve a smooth, visually appealing surface, the joints between the gypsum wallboards, any cracks, screw holes, and/or nail holes should be concealed. Typically, joint compound compositions are utilized for such purpose. In particular, one such type of joint compound is a drying-type joint compound. Typically for these joint compound compositions, the composition is mixed for a specific time with water prior to use and is then applied. After application, the water evaporates and the compound dries to form a relatively hard cementitious material. While many types of drying-type joint compound compositions exist, they may still exhibit some deficiencies. For instance, because the compositions have to be prepared in advance, they may tend to dry or become more viscous throughout the day thereby requiring the addition of more water and/or the preparation of an entire new composition.

As a result, there is a need to provide an improved joint compound composition, in particular a drying-type joint compound composition.

SUMMARY OF THE INVENTION

In accordance with one embodiment of the present invention, a joint compound composition is disclosed. The joint compound composition comprises water, a cementitious filler, a mineral filler, and an elastomer wherein the joint compound composition exhibits a viscosity of 50 poise or less when measured at a temperature of 23° C. and shear rate of 100 $s^{-1}$ and/or a yield stress of 1,500 dynes/cm$^2$ or less.

In accordance with another embodiment of the present invention, a method of making a joint compound composition is disclosed. The method comprises: combining water, a cementitious filler, a mineral filler, and an aqueous dispersion including an elastomer.

DETAILED DESCRIPTION

Reference now will be made in detail to embodiments, one or more examples of which are illustrated in the drawings. Each example is provided by way of explanation of the embodiments, not as a limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally speaking, the present invention is directed to a joint compound composition. The joint compound composition includes water, a cementitious filler, a mineral filler, and an elastomer as defined herein. The present inventors have discovered that the particular joint compound composition as defined herein provides various advantages, in particular when utilized within the building industry.

In particular, the present inventors have discovered that the joint compound composition demonstrates an improved performance. For instance, when compared to other conventional joint compound compositions, the present joint compound composition has better flow characteristics and takes less effort to apply. In this regard, the present joint compound composition exhibits a relatively low viscosity. For instance, the joint compound composition may exhibit a viscosity of 50 poise or less, such as 40 poise or less, such as 30 poise or less, such as 25 poise or less, such as 20 poise or less, such as 15 poise or less, such as 10 poise or less when measured at a temperature of 23° C. and according to the method described below at a shear rate of 100 $s^{-1}$. The viscosity may be 1 poise or more, such as 2 poise or more, such as 3 poise or more, such as 4 poise or more, such as 5 poise or more, such as 6 poise or more, such as 7 poise or more, such as 8 poise or more, such as 9 poise or more, such as 10 poise or more when measured at a temperature of 23° C. and according to the method described below at a shear rate of 100 $s^{-1}$.

In addition, the joint compound composition as disclosed herein may demonstrate a lower yield stress. For instance, the yield stress may be 1,500 dynes/cm$^2$ or less, such as 1,300 dynes/cm$^2$ or less, such as 1,100 dynes/cm$^2$ or less, such as 1,000 dynes/cm$^2$ or less, such as 800 dynes/cm$^2$ or less, such as 600 dynes/cm$^2$ or less, such as 500 dynes/cm$^2$ or less, such as 400 dynes/cm$^2$ or less when measured at a temperature of 23° C. and according to the method described below. The yield stress may be 100 dynes/cm$^2$ or more, such as 200 dynes/cm$^2$ or more, such as 300 dynes/cm$^2$ or more, such as 400 dynes/cm$^2$ or more, such as 500 dynes/cm$^2$ or more when measured at a temperature of 23° C. and according to the method described below. Without intending to be limited by theory, the lower yield stress generally indicates a lower effort to apply. In addition, the present inventors have discovered that, unlike more conventional joint compound compositions, the joint compound composition as disclosed herein has a longer "life." For instance, the joint compound composition as disclosed herein may be able to sit for a longer period of time without thickening to a degree that would require remixing.

In addition to the advantages mentioned above, the joint compound composition as disclosed herein may also exhibit other beneficial properties. For instance, the joint compound composition may also result in one or more of reduced cratering, reduced shrinking, greater sag resistance, and excellent workability.

As indicated herein, the joint compound composition includes water. In this regard, water may be present in an amount of at least 10 wt. %, such as at least 20 wt. %, such as at least 30 wt. %, such as at least 35 wt. %, such as at least 40 wt. %, such as at least 45 wt. %, such as at least 50 wt. % based on the weight of the joint compound composition. The water may be present in an amount of 90 wt. % or less, such as 80 wt. % or less, such as 70 wt. % or less, such as 60 wt. % or less, such as 55 wt. % or less, such as 50 wt. % or less, such as 45 wt. % or less, such as 40 wt. % or less based on the weight of the joint compound composition.

As also indicated herein, the joint compound composition includes a cementitious filler. The cementitious filler may include calcium carbonate, calcium magnesium carbonate, calcium sulfate dihydrate, or a mixture thereof. In one embodiment, the cementitious filler may include calcium carbonate. In another embodiment, the cementitious filler may include calcium magnesium carbonate. In a further embodiment, the cementitious filler may include calcium sulfate dihydrate. In another further embodiment, the cementitious filler may include a mixture of at least two of calcium carbonate, calcium magnesium carbonate, and calcium sulfate dihydrate, such as a mixture of calcium carbonate and calcium magnesium carbonate, a mixture of calcium carbonate and calcium sulfate dihydrate, or a mixture of calcium magnesium carbonate and calcium sulfate dihydrate. In a further embodiment, the cementitious filler may include a mixture of calcium carbonate, calcium magnesium carbonate, and calcium sulfate dihydrate.

Regardless, the cementitious filler may be present in an amount of at least 5 wt. %, such as at least 10 wt. %, such as at least 20 wt. %, such as at least 30 wt. %, such as at least 35 wt. %, such as at least 40 wt. %, such as at least 45 wt. %, such as at least 50 wt. % based on the weight of the joint compound composition. The cementitious filler may be present in an amount of 70 wt. % or less, such as 60 wt. % or less, such as 55 wt. % or less, such as 50 wt. % or less, such as 45 wt. % or less, such as 40 wt. % or less based on the weight of the joint compound composition. In addition, it should be understood that the aforementioned weight percentages may apply to a single cementitious filler used alone as well as a mixture of cementitious fillers.

In addition, the joint compound composition includes a mineral filler. The mineral filler may include a silicate. The silicate may be a nesosilicate, a sorosilicate, a cyclosilicate, an inosilicate, a phyllosilicate, a tectosilicate, or a mixture thereof. In one particular embodiment, the silicate may be a phyllosilicate. For instance, the mineral filler may include kaolin, montmorillonite, vermiculite, illite, halloysite, talc, pyrophyllite, palygorskite, sepiolite, mica, or a mixture thereof. In particular, the mineral filler may comprise mica, talc, pyrophyllite, or a mixture thereof. In one embodiment, the mineral filler may include mica. In another embodiment, the mineral filler may include talc. In another embodiment, the mineral filler may include pyrophyllite. In a further embodiment, the mineral filler may include a mixture of at least two of mica, talc, and pyrophyllite. For instance, the mineral filler may include a mixture of mica and talc. Alternatively, the mineral filler may include a mixture of talc and pyrophyllite. In another embodiment, the mineral filler may include a mixture of mica and pyrophyllite. In another further embodiment, the mineral filler may include a mixture of mica, talc, and pyrophyllite.

Regardless, the mineral filler may be present in an amount of at least 0.5 wt. %, such as at least 1 wt. %, such as at least 2 wt. %, such as at least 5 wt. %, such as at least 8 wt. %, such as at least 10 wt. % based on the weight of the joint compound composition. The mineral filler may be present in an amount of 30 wt. % or less, such as 25 wt. % or less, such as 20 wt. % or less, such as 15 wt. % or less, such as 13 wt. % or less, such as 11 wt. % or less, such as 10 wt. % or less, such as 8 wt. % or less, such as 6 wt. % or less, such as 5 wt. % or less based on the weight of the joint compound composition. In addition, it should be understood that the aforementioned weight percentages may apply to a single mineral filler used alone as well as a mixture of mineral fillers.

As indicated herein, the joint compound composition may include an elastomer. For instance, the elastomer may be an elastomeric polyester, an elastomeric polyurethane, an elastomeric polyamide, an elastomeric copolymer, and the like, and a mixture thereof. In one embodiment, the elastomer may be a copolymer. For instance, the copolymer may be a block copolymer, such as a substantially amorphous block copolymer having at least two blocks. The blocks may include a monoalkenyl arene polymer at and at least one block of a saturated conjugated diene polymer. In general, the monoalkenyl arene block may include a styrene. The styrene may include analogues and homologues, such as o-methyl styrene, p-methyl styrene, p-tert-butyl styrene, 2,3-dimethyl styrene, etc. The conjugated diene blocks may include a homopolymer of a conjugated diene monomer, a copolymer of two or more conjugated diene monomers, or a copolymer of one or more of the diene monomers with another monomer in which the blocks are predominantly conjugated diene units. The conjugated diene monomer may generally contain from 4 to 8 carbon atoms, such as 1,3-butadiene (butadiene), 2-methyl-1,3-butadiene, isoprene, 2,3-dimethyl-1,3-butadiene, 1,3-pentadiene (piperylene), 1,3-hexadiene, etc. The amount of monoalkenyl arene blocks may vary but may typically constitute 5 wt. % or more, such as 10 wt. % or more, such as 20 wt. % or more, such as 30 wt. % or more, such as 40 wt. % or more to 85 wt. % or less, such as 70 wt. % or less, such as 60 wt. % or less, such as 55 wt. % or less, such as 50 wt. % or less, such as 40 wt. % or less, such as 35 wt. % or less, such as 30 wt. % or less of the copolymer.

The elastomer may include a styrene-diene block copolymer, such as styrene-butadiene, styrene-isoprene, styrene-butadiene-styrene, styrene-isoprene-styrene, etc. The elastomer may also include a styrene-olefin block copolymer, such as styrene-(ethylene-butylene), styrene-(ethylene-propylene), styrene-(ethylene-butylene)-styrene, styrene-(ethylene-propylene)-styrene, styrene-(ethylene-butylene)-styrene-(ethylene-butylene), styrene-(ethylene-propylene)-styrene-(ethylene-propylene), and styrene-ethylene-(ethylene-propylene)-styrene. In one particular embodiment, the elastomer includes styrene-butadiene.

Regardless, the elastomer may be present in an amount of 0.001 wt. % or more, such as 0.01 wt. % or more, such as 0.05 wt. % or more, such as 0.1 wt. % or more, such as 0.2 wt. % or more, such as 0.25 wt. % or more, such as 0.3 wt. % or more, such as 0.4 wt. % or more, such as 0.5 wt. % or more, such as 0.6 wt. % or more, such as 0.7 wt. % or more, such as 0.8 wt. % or more, such as 0.9 wt. % or more, such as 1 wt. % or more based on the weight of the joint compound composition. The elastomer may be present in an amount of 5 wt. % or less, such as 4 wt. % or less, such as 3 wt. % or less, such as 2 wt. % or less, such as 1.5 wt. % or less, such as 1.4 wt. % or less, such as 1.3 wt. % or less, such as 1.2 wt. % or less, such as 1.1 wt. % or less, such as 1 wt. % or less, such as 0.9 wt. % or less, such as 0.8 wt. % or less, such as 0.7 wt. % or less, such as 0.6 wt. % or less, such as 0.5 wt. % or less, such as 0.4 wt. % or less based on the weight of the joint compound composition. In addition, it should be understood that the aforementioned weight percentages may apply to an elastomer used alone as well as a mixture of elastomers.

The elastomer may have a mean particle size of 0.01 μm or more, such as 0.05 μm or more, such as 0.1 μm or more, such as 0.12 μm or more, such as 0.14 μm or more, such as 0.15 μm or more, such as 0.2 μm or more. The elastomer may have a mean particle size of 1 μm or less, such as 0.8 μm or less, such as 0.6 μm or less, such as 0.5 μm or less, such as 0.4 μm or less, such as 0.3 μm or less, such as 0.25 μm or less, such as 0.2 μm or less, such as 0.18 μm or less, such as 0.16 μm or less, such as 0.15 μm or less. The mean particle size may be determined using various techniques as known in the art.

In one embodiment, the elastomer may be functionalized. For example, the terminals of the elastomer may be functionalized. The functional group may include an amine, a hydroxyl, an alkoxy, a sulfonate, a carboxyl, a phosphonate, a halogen, or a thiol. In one particular embodiment, functional group may include a carboxyl to provide a carboxylated elastomer. The carboxyl group may include, but is not limited to, an acrylic acid, a methacrylic acid, a maleic acid, an itaconic acid, etc.

The elastomer may have an elongation at break of 100% or more, such as 200% or more, such as 300% or more, such as 500% or more, such as 700% or more, such as 900% or more, such as 1,000% or more. The elastomer may have an elongation at break of 2,500% or less, such as 2,000% or less, such as 1,800% or less, such as 1,500% or less, such as 1,300% or less, such as 1,100% or less, such as 1,000% or less. The elongation at break may be determined according to ASTM D412-16.

In one embodiment, the elastomer may be presented as a dispersion, such as an aqueous dispersion. For example, the dispersion may include at least 10 wt. %, such as at least 20 wt. %, such as at least 30 wt. %, such as at least 40 wt. %, such as at least 45 wt. %, such as at least 50 wt. % solids based on the entire weight of the dispersion. The dispersion may include 80 wt. % or less, such as 70 wt. % or less, such as 60 wt. % or less, such as 55 wt. % or less, such as 50 wt. % or less solids based on the entire weight of the dispersion. The solids content may be determined in accordance with ISO 3251. One example of a commercially available elastomer is Lipaton® SB 5843 provided by Synthomer®.

As indicated herein, the joint compound composition may include a siloxane polymer. For instance, the siloxane polymer may be a dialkylsiloxane polymer. In this regard, the alkyl may be a $C_1$-$C_4$ alkyl, such as a $C_1$-$C_2$ alkyl, such as a $C_1$ alkyl (i.e., methyl). Accordingly, the siloxane polymer may be a dimethylsiloxane polymer (polydimethylsiloxane). Furthermore, the siloxane polymer may be modified. The modification may be a terminal modification or a side chain modification (e.g., to the alkyl, such as the methyl). In one embodiment, the modification is a terminal modification. In another embodiment, the modification is a side chain modification. Regardless, the modification may be by using a polyether to provide a polyether siloxane polymer (in other words a dimethicone copolyol). The polyether may be formed from polyethylene glycol, polypropylene glycol, or a mixture thereof. Such polyether may have 2 or more, such as 3 or more, such as 4 or more, such as 5 or more, such as 8 or more, such as 10 or more moles or repeat units. Such polyether may have 30 or less, such as 25 or less, such as 20 or less, such as 18 or less, such as 16 or less, such as 12 or less, such as 10 or less, such as 8 or less moles or repeat units. In one particular embodiment, the modification is a polyethylene glycol to provide a polyoxyethylene modified siloxane polymer, in particular a polyoxyethylene modified polydimethylsiloxane.

Regardless, the siloxane polymer may be present in an amount of 0.001 wt. % or more, such as 0.01 wt. % or more, such as 0.05 wt. % or more, such as 0.1 wt. % or more, such as 0.2 wt. % or more, such as 0.25 wt. % or more, such as 0.3 wt. % or more, such as 0.4 wt. % or more, such as 0.5 wt. % or more, such as 0.75 wt. % or more, such as 1 wt. % or more based on the weight of the joint compound composition. The siloxane polymer may be present in an amount of 5 wt. % or less, such as 4 wt. % or less, such as 3 wt. % or less, such as 2 wt. % or less, such as 1.5 wt. % or less, such as 1.25 wt. % or less, such as 1 wt. % or less, such as 0.9 wt. % or less, such as 0.8 wt. % or less, such as 0.7 wt. % or less, such as 0.6 wt. % or less, such as 0.5 wt. % or less, such as 0.4 wt. % or less based on the weight of the joint compound composition.

In addition, the joint compound composition may also include a binder. The binder may include an acetate polymer, an acrylic polymer, a polyvinyl alcohol, a cellulose polymer, a starch, etc., or a mixture thereof. In one embodiment, the binder may include at least two of an acetate polymer, an acrylic polymer, a polyvinyl alcohol, a cellulose polymer, or a starch. For instance, in one embodiment, the binder may include at least a mixture of an acetate polymer and a cellulose polymer. In a further embodiment, the binder may include at least an acetate polymer. In another further embodiment, the binder may include at least a cellulose polymer.

The acetate polymer may include a vinyl acetate, such as an ethylene vinyl acetate. For instance, the acetate polymer may be a polyvinyl acetate, a polyethylene vinyl acetate, or a mixture thereof. In one embodiment, the acetate polymer may include polyvinyl acetate. In another embodiment, the acetate polymer may include polyethylene vinyl acetate. In an even further embodiment, the acetate polymer may be a mixture of two acetate polymers, such as any two of the aforementioned.

The acrylic polymer may be any acrylic polymer. For instance, the acrylic polymer may be a polyacrylate. In a further embodiment, the acrylic polymer may be a polyvinyl acrylic polymer. In another further embodiment, the acrylic polymer may be a polyvinyl acetate acrylate. In an even further embodiment, the acrylic polymer may be a mixture of two acrylic polymers, such as any two of the aforementioned.

The cellulose polymer may include a cellulose ether. For instance, the cellulose ether may include one wherein the hydroxyl groups are partially or fully replaced by —OR groups, wherein R is a substituted or substituted alkyl. For instance, the alkyl may be a $C_1$-$C_6$ alkyl. In particular, the alkyl may be methyl, ethyl, propyl, or a combination thereof. If a substitution is present, the substitution may include a hydroxy or a sulfo substitution. In addition, in one embodiment, the cellulose ether may be soluble in water at ambient temperature. The cellulose ether may be an alkyl cellulose, a hydroxyalkyl cellulose, or a mixture thereof. The cellulose ether may include, but is not limited to methylcellulose, ethyl cellulose, propyl cellulose, butyl cellulose, hydroxyethyl methylcellulose, hydroxypropyl methylcellulose, hydroxyethyl cellulose, ethylhydroxyethylcellulose, methylethylhydroxyethylcellulose, methylhydroxyethylcellulose, ethylmethylhydroxypropylcellulose, ethylhydroxyethylcellulose, etc., and mixtures thereof. In one particular embodiment, the cellulose ether may be a hydroxypropyl methylcellulose. The cellulose ether may have a particular degree of substitution (i.e., the average number of substituted hydroxyl groups per glucose united). The degree of substitution may be 0.1 or more, such as 0.2 or more, such as 0.3 or more, such as 0.5 or more, such as 1 or more, such as 1.3 or more, such as 1.5 or more, such as 2 or more. The degree of substitution may be 3 or less, such as 2.8 or less, such as 2.5 or less, such as 2.3 or less, such as 2 or less.

Regardless, the binder may be present in an amount of 0.001 wt. % or more, such as 0.01 wt. % or more, such as 0.05 wt. % or more, such as 0.1 wt. % or more, such as 0.2 wt. % or more, such as 0.25 wt. % or more, such as 0.3 wt. % or more, such as 0.4 wt. % or more, such as 0.5 wt. % or more, such as 0.6 wt. % or more, such as 0.7 wt. % or more, such as 0.8 wt. % or more, such as 0.9 wt. % or more, such as 1 wt. % or more based on the weight of the joint compound composition. The binder may be present in an amount of 10 wt. % or less, such as 8 wt. % or less, such as 6 wt. % or less, such as 5 wt. % or less, such as 4 wt. % or less, such as 3 wt. % or less, such as 2 wt. % or less, such as 1.5 wt. % or less, such as 1.4 wt. % or less, such as 1.3 wt. % or less, such as 1.2 wt. % or less, such as 1.1 wt. % or less, such as 1 wt. % or less, such as 0.9 wt. % or less, such as 0.8 wt. % or less, such as 0.7 wt. % or less, such as 0.6 wt. % or less, such as 0.5 wt. % or less, such as 0.4 wt. % or less based on the weight of the joint compound composition. In addition, it should be understood that the aforementioned weight percentages may apply to a single binder used alone as well as a mixture of binders.

In one embodiment, the binder may be presented as an emulsion. For example, the emulsion may include at least 10 wt. %, such as at least 20 wt. %, such as at least 30 wt. %, such as at least 40 wt. %, such as at least 45 wt. %, such as at least 50 wt. % actives based on the entire weight of the emulsion. The emulsion may include 80 wt. % or less, such as 70 wt. % or less, such as 60 wt. % or less, such as 55 wt. % or less, such as 50 wt. % or less actives based on the entire weight of the emulsion.

In addition, in one embodiment, the joint compound composition may also include other additional fillers. For instance, these other additional fillers may include perlite, glass, etc. In one embodiment, the additional filler may include perlite. The perlite may be unexpanded perlite, expanded perlite, or a mixture thereof. In one embodiment, the perlite may include expanded perlite. In another embodiment, the additional filler may include a glass.

The additional filler, such as the perlite, may be treated. In one embodiment, it may remain untreated. In another embodiment, it may be treated such as to providing a coating. For instance, the treatment may be a hydrophobic treatment to provide a hydrophobic filler, such as a hydrophobic perlite. Such hydrophobicity may be obtained by treated the perlite with a surface-active agent. In this regard, the treatment and coating may be with one or more silanes, siloxanes, silicone coatings, or a mixture thereof. These may include in particular, but are not limited to, dimethyl silicone, dimethydichlorosilane or polydimethylsiloxane. In addition or alternatively, coatings may also include titanates or zirconates. The coating may be provided in an amount of 0.01 wt. % or more, such as 0.02 wt. % or more, such as 0.05 wt. % or more, such as 0.1 wt. % or more, such as 0.2 wt. % or more, such as 0.5 wt. % or more to 5 wt. % or less, such as 4 wt. % or less, such as 3 wt. % or less, such as 2.5 wt. % or less, such as 2 wt. % or less, such as 1.5 wt. % or less, such as 1 wt. % or less based on the uncoated weight of the filler, such as the perlite.

Regardless, the additional filler may be present in an amount of at least 0.5 wt. %, such as at least 1 wt. %, such as at least 2 wt. %, such as at least 5 wt. %, such as at least 6 wt. %, such as at least 8 wt. %, such as at least 10 wt. % based on the weight of the joint compound composition. The additional filler may be present in an amount of 30 wt. % or less, such as 25 wt. % or less, such as 20 wt. % or less, such as 15 wt. % or less, such as 13 wt. % or less, such as 11 wt. % or less, such as 10 wt. % or less, such as 8 wt. % or less, such as 6 wt. % or less, such as 5 wt. % or less based on the weight of the joint compound composition. In addition, it should be understood that the aforementioned weight percentages may apply to a single additional filler used alone as well as a mixture of additional fillers.

In addition, the joint compound composition may also include a surfactant. In one particular embodiment, the joint compound composition may also include two surfactants. For instance, the surfactant may be cationic, anionic, nonionic, or amphoteric. In one embodiment, the surfactant may be anionic. In another embodiment, the surfactant may be nonionic. In a further embodiment, the surfactant may include one that is anionic and another that is nonionic. In this regard, the surfactant may include an surfactant system.

The anionic surfactant may include, but is not limited to, alkyl sulfates, sulfates of ethoxylate alcohols, aryl sulfonates, phosphates of ethoxylated alcohols, sulfosuccinates, sulfates and sulfonates of ethoxylated alkylphenols, and mixtures thereof. The nonionic surfactant may include, but is not limited to, ethoxylated alcohols, ethoxylated alkylphenols, and mixtures thereof. In one embodiment, the nonionic surfactant may be one that is known to be environmentally benign and (alkyl phenyl ethoxylate)-free, especially (nonylphenol ethoxylate)-free, examples of which include linear and/or branched alkyl ethoxylates. The cationic surfactant may include, but is not limited to, ethoxylated fatty amines and salts thereof. In one embodiment, the surfactant may include one having a polymerizable carbon-carbon double bond. These may include, but are not limited to, alkylphenol ethoxylates containing alkenyl substituents, polyoxyalkylene alkyl ether sulfate salts, salts of poly(oxy-1,2-ethanediyl), alpha-sulfo-omega-[1-(hydroxymethyl)-2-(2-propenyloxy)ethoxy], etc. Additional surfactants may include, but are not limited to, saturated and ethylenically unsaturated sulfonic acids or salts thereof, including, for example, unsaturated hydrocarbonsulfonic acid, such as vinylsulfonic acid, allylsulfonic acid and methallylsulfonic acid, and salts thereof; aromatic hydrocarbon acids, such as, for example, p-styrenesulfonic acid, isopropenylbenzenesulfonic acid and vinyloxybenzenesulfonic acid and salts thereof; sulfoalkyl esters of acrylic acid and methacrylic acid, such as, for example, sulfoethyl methacrylate and sulfopropyl methacrylate and salts thereof, and 2-acrylamido-2-methylpropanesulfonic acid and salts thereof; alkylated diphenyl oxide disulfonates, sodium dodecylbenzenesulfonates and dihexyl esters of sodium sulfosuccinate, ethoxylated alkylphenols and ethoxylated alcohols, fatty alcohol (poly)ethersulfates and salts thereof.

The surfactant may be one that is suitable for use in a polymerization process. For example, in one embodiment, the surfactant may be present within the aforementioned elastomer dispersion. In this regard, during synthesis of the elastomer, a surfactant may be utilized and present in the dispersion. Such surfactant may accordingly be present in the joint compound composition.

Regardless, the surfactant may be present in an amount of 0.001 wt. % or more, such as 0.01 wt. % or more, such as 0.05 wt. % or more, such as 0.1 wt. % or more, such as 0.2 wt. % or more, such as 0.25 wt. % or more, such as 0.3 wt. % or more, such as 0.4 wt. % or more, such as 0.5 wt. % or more, such as 0.6 wt. % or more, such as 0.7 wt. % or more, such as 0.8 wt. % or more, such as 0.9 wt. % or more, such as 1 wt. % or more based on the weight of the joint compound composition. The surfactant may be present in an amount of 5 wt. % or less, such as 4 wt. % or less, such as 3 wt. % or less, such as 2 wt. % or less, such as 1.5 wt. % or less, such as 1.4 wt. % or less, such as 1.3 wt. % or less, such as 1.2 wt. % or less, such as 1.1 wt. % or less, such as 1 wt. % or less, such as 0.9 wt. % or less, such as 0.8 wt. % or less, such as 0.7 wt. % or less, such as 0.6 wt. % or less, such as 0.5 wt. % or less, such as 0.4 wt. % or less based on the weight of the joint compound composition. In addition, it should be understood that the aforementioned weight percentages may apply to a single surfactant used alone as well as a mixture of surfactants.

In addition, the joint compound composition may also include a defoamer. The defoamer may include mineral oil, silicone oil, hydrocarbon oil, a polyglycol, a fatty acid derivative, a trialkyl phosphate, etc., or a mixture thereof. In one embodiment, the defoamer may include mineral oil (e.g., paraffin oil). In another embodiment, the defoamer may include silicone oil. In a further embodiment, the defoamer may include a mixture of mineral oil and silicone oil.

The defoamer may be one that is suitable for use in a polymerization process. For example, in one embodiment, the defoamer may be present within the aforementioned elastomer dispersion. In this regard, during synthesis of the elastomer, a defoamer may be utilized and present in the dispersion. Such defoamer may accordingly be present in the joint compound composition.

Regardless, the defoamer may be present in an amount of 0.001 wt. % or more, such as 0.01 wt. % or more, such as 0.05 wt. % or more, such as 0.1 wt. % or more, such as 0.2 wt. % or more, such as 0.25 wt. % or more, such as 0.3 wt. % or more, such as 0.4 wt. % or more, such as 0.5 wt. % or more, such as 0.6 wt. % or more, such as 0.7 wt. % or more, such as 0.8 wt. % or more, such as 0.9 wt. % or more, such as 1 wt. % or more based on the weight of the joint compound composition. The defoamer may be present in an amount of 5 wt. % or less, such as 4 wt. % or less, such as 3 wt. % or less, such as 2 wt. % or less, such as 1.5 wt. % or less, such as 1.4 wt. % or less, such as 1.3 wt. % or less, such as 1.2 wt. % or less, such as 1.1 wt. % or less, such as 1 wt. % or less, such as 0.9 wt. % or less, such as 0.8 wt. % or less, such as 0.7 wt. % or less, such as 0.6 wt. % or less, such as 0.5 wt. % or less, such as 0.4 wt. % or less based on the weight of the joint compound composition. In addition, it should be understood that the aforementioned weight percentages may apply to a single defoamer used alone as well as a mixture of defoamers.

The joint compound composition may also include other additives as generally known in the art. These additives may include, but are not limited to stabilizers, suspending agents, preservatives, pigments, colorants, flattening agents, UV absorbers, UV stabilizers, chemical markers/traceability agents, etc.

For instance, in one embodiment, the joint compound composition may include at least one preservative. The preservative may include a biocide. For instance, such preservative may include a bactericide, a fungicide, a mildewcide, or a mixture thereof. Such preservatives may include any typically utilized in the art. For instance, they may include carbamates (e.g., IPBC), pyrithiones (e.g., sodium pyrithione, zinc pyrithione, etc.), isothiazolinones (e.g., BIT, BBIT), azoles (e.g., benzimidazoles, such as 2-(methoxycarbonylamino)benzimidazole), amines (e.g., alkanolamines, such as ethanolamines and in particular N-methylolethanolamine), etc. as well as mixtures thereof. In one particular embodiment, the biocide may include a mixture of an amine, an azole, and a carbamate. In another embodiment, the biocide may include a mixture of a pyrithione, an isothiazolinone, and a carbamate.

Regardless, the preservative may be present in an amount of 0.001 wt. % or more, such as 0.01 wt. % or more, such as 0.05 wt. % or more, such as 0.1 wt. % or more, such as 0.2 wt. % or more, such as 0.25 wt. % or more, such as 0.3 wt. % or more, such as 0.4 wt. % or more, such as 0.5 wt. % or more, such as 0.75 wt. % or more, such as 1 wt. % or more based on the weight of the joint compound composition. The preservative may be present in an amount of 5 wt. % or less, such as 4 wt. % or less, such as 3 wt. % or less, such as 2 wt. % or less, such as 1.5 wt. % or less, such as 1.25 wt. % or less, such as 1 wt. % or less, such as 0.9 wt. % or less, such as 0.8 wt. % or less, such as 0.7 wt. % or less, such as 0.6 wt. % or less, such as 0.5 wt. % or less, such as 0.4 wt. % or less based on the weight of the joint compound composition. In addition, it should be understood that the aforementioned weight percentages may apply to a single preservative used alone as well as a mixture of preservatives.

The joint compound composition may have a particular solids to water ratio. For instance, the solids may constitute 25 wt. % or more, such as 30 wt. % or more, such 35 wt. % or more, such as 40 wt. % or more, such as 45 wt. % or more, such as 50 wt. % or more of the joint compound composition. The solids may constitute 80 wt. % or less, such as 75 wt. % or less, such as 70 wt. % or less, such as 65 wt. % or less, such as 60 wt. % or less, such as 55 wt. % or less, such as 50 wt. % or less of the joint compound composition.

Furthermore, the present invention is also directed to a method of making the aforementioned joint compound composition. In particular, the method may include a step of combining and mixing any of the aforementioned ingredients. In particular, in one embodiment, the method may include a step of providing or combining and mixing water, a cementitious filler, a mineral filler, and an aqueous dispersion including an elastomer. Furthermore, as indicated above, in one embodiment, the aqueous dispersion may include a surfactant, a defoamer, or a mixture thereof. In one embodiment, the aqueous dispersion may include at least one surfactant. In particular, the aqueous dispersion may include at least two surfactants. In addition, in one embodiment, the aqueous dispersion may include a mixture of a surfactant and a defoamer. In particular, the aqueous dispersion may include a mixture of at least two surfactants and a defoamer.

These components provided with respect to the method are as defined above with respect to the joint compound composition. In addition, it should be understood that, in the method, the other components mentioned above with respect to the joint compound composition may also be provided, combined, and/or mixed in the method. Furthermore, the resulting joint compound composition may have the individual components within the weight percentages as mentioned above with respect to the joint compound composition. In addition, the resulting joint compound composition may also have the properties as mentioned above with respect to the joint compound composition.

The joint compound composition as mentioned herein may have application in the building industry. For instance, the joint compound composition may be available as a "ready-mix" formulation (ready to use without needing additional water). The joint compound composition can be utilized with gypsum wallboards. In particular, the joint compound compositions can be applied to gaps (or joints) between adjacent, affixed gypsum wallboards, whether applied to a gap itself or joint tape applied over the gap. In addition, the joint compound composition can be applied to any cracks or screw holes and/or nail holes used to affix the gypsum wallboards. Such application of the joint compound composition can provide a smooth, visually appealing surface.

In addition, with the use of the components as defined herein, the joint compound composition is generally regarded as a drying-type joint compound composition. For instance, after application, the water evaporates and the composition dries to form a relatively hard cementitious material. Once hardened, the remaining material may be sanded to provide a smoother surface that may be later manipulated (e.g., painted).

EXAMPLES

Test Methods

Viscosity and Yield Stress: Shear stress sweeps were utilized to determine the viscosity and yield stress of the joint compound composition. Shear rate sweeps were utilized to determine the degree of shear thinning of the joint compound composition. The sample was mixed by hand and allowed to sit at ambient temperature and undisturbed for about 1.5 hours prior to testing. From the shear stress sweeps, the yield stress was taken as the point at which the viscosity decreases rapidly. For the sweeps, an ARES G2 rheometer (TA Instruments) was outfitted with a parallel plate geometry was used to measure the rheological properties of the sample. Both shear stress and shear rate sweeps were performed at 23° C. For the shear stress sweep, the stress was ramped from 102 to 104 dynes/cm². For the shear rate sweep, data were collected over the 0.1 to 100 s$^{-1}$ range.

Example 1

A joint compound composition was prepared according to the formulation provided below. In addition, the ethylene vinyl acetate latex emulsion contained 55 wt. % actives while the styrene-butadiene dispersion contained 48.5 wt. % solids. Also, the styrene-butadiene dispersion contained an emulsifier system and a defoamer.

| Component | Mass (g) | Wt. % |
|---|---|---|
| Water | 850 | 43.80% |
| Preservatives | 3.5 | 0.20% |
| Limestone (i.e., CaCO₃) | 650 | 33.50% |
| Pyrophyllite | 90 | 4.60% |
| Talc | 96.5 | 5.00% |
| Perlite | 150 | 7.70% |
| Polyether siloxane copolymer | 1 | 0.10% |
| Ethylene vinyl acetate latex emulsion | 52 | 2.70% |
| Styrene-butadiene dispersion | 37 | 1.90% |
| Cellulose ether | 10 | 0.50% |

Based on the data, the yield stress was approximately 500 dynes/cm² and the viscosity was approximately 8 poise at shear rate of 100 s$^{-1}$. Such yield stress and viscosity were much lower than a commercially available joint compound formulation, for example one that utilized a powder form of styrene-butadiene. For example, such formulation exhibited a yield stress of approximately 2,000 dynes/cm² and a viscosity of approximately 90 poise at 100 s$^{-1}$.

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

The invention claimed is:

1. A joint compound composition comprising:
water,
a cementitious filler in an amount of 70 wt. % or less, one or more mineral fillers, the total amount of mineral fillers in the joint compound composition being at least 0.5 wt. % to 8 wt. % or less based on the weight of the joint compound composition, and
an elastomer,
wherein the joint compound composition exhibits a viscosity of 25 poise or less to 2 poise or more when measured at a temperature of 23° C. and shear rate of 100 s$^{-1}$ and/or a yield stress of 1,500 dynes/cm² or less to 100 dynes/cm² or more.

2. The joint compound composition of claim 1, wherein the joint compound composition exhibits a viscosity of 25 poise or less to 2 poise or more when measured at a temperature of 23° C. and shear rate of 100 s$^{-1}$ and a yield stress of 1,500 dynes/cm² or less to 100 dynes/cm² or more.

3. The joint compound composition of claim 1, wherein the joint compound composition exhibits a viscosity of 20 poise or less to 2 poise or more when measured at a temperature of 23° C. and shear rate of 100 s$^{-1}$ and a yield stress of 1,000 dynes/cm² or less to 100 dynes/cm² or more.

4. The joint compound composition of claim 1, wherein the cementitious filler comprises calcium carbonate.

5. The joint compound composition of claim 4, wherein the calcium carbonate is present in an amount of from 20 wt. % to 50 wt. % based on the weight of the joint compound composition.

6. The joint compound composition of claim 1, wherein the one more mineral fillers comprises a silicate.

7. The joint compound composition of claim 1, wherein the one or more mineral fillers comprises a pyrophyllite.

8. The joint compound composition of claim 1, wherein the total amount of the one or more mineral fillers is at least 2 wt. % to 8 wt. % or less based on the weight of the joint compound composition.

9. The joint compound composition of claim 1, wherein the elastomer comprises an elastomeric copolymer.

10. The joint compound composition of claim 1, wherein the elastomer comprises a styrene-butadiene.

11. The joint compound composition of claim 1, wherein the elastomer is present in an amount of from 0.01 wt. % to 5 wt. % based on the weight of the joint compound composition.

12. The joint compound composition of claim 1, wherein the joint compound composition further comprises at least one surfactant comprising an anionic surfactant, a nonionic surfactant, or a mixture thereof.

13. The joint compound composition of claim 1, wherein the joint compound composition further comprises a mineral oil, a silicone oil, or a mixture thereof.

14. The joint compound composition of claim 1, wherein the joint compound composition further comprises a siloxane polymer.

15. The joint compound composition of claim 14, wherein the siloxane polymer is present in an amount of from 0.001 wt. % to 5 wt. % based on the weight of the joint compound composition.

16. The joint compound composition of claim 1, wherein the joint compound composition further comprises a binder comprising an acetate polymer, a cellulose polymer, or a mixture thereof.

17. The joint compound composition of claim 16 wherein the binder is present in an amount of from 0.01 wt. % to 10 wt. % based on the weight of the joint compound composition.

18. The joint compound composition of claim 1, wherein the joint compound composition further comprises a perlite.

19. The joint compound composition of claim 18, wherein the perlite is present in an amount of from 1 wt. % to 15 wt. % based on the weight of the joint compound composition.

20. A method of making a joint compound composition, the method comprising:

combining and mixing water, a cementitious filler, one or more mineral fillers wherein the total amount of more mineral fillers in the joint compound composition is at least 0.5 wt. % to 8 wt. % or less based on the weight of the joint compound composition, and an aqueous dispersion including an elastomer, at least one surfactant, and a defoamer comprising a mineral oil, a silicone oil, or a mixture thereof, wherein the joint compound composition exhibits a viscosity of 25 poise or less to 2 poise or more when measured at a temperature of 23° C. and shear rate of 100 $s^{-1}$ and/or a yield stress of 1,500 dynes/$cm^2$ or less to 100 dynes/$cm^2$ or more.

21. The joint compound composition of claim 1, wherein the one or more mineral fillers comprise a phyllosilicate.

* * * * *